United States Patent
Aramaki

(10) Patent No.: US 6,846,586 B2
(45) Date of Patent: Jan. 25, 2005

(54) FUEL CELL SYSTEM

(75) Inventor: Kazuyoshi Aramaki, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 483 days.

(21) Appl. No.: 09/964,676

(22) Filed: Sep. 28, 2001

(65) Prior Publication Data

US 2002/0039672 A1 Apr. 4, 2002

(30) Foreign Application Priority Data

Oct. 4, 2000 (JP) .................................... P2000-304673

(51) Int. Cl.$^7$ .............................................. H01M 8/04
(52) U.S. Cl. .......................... 429/22; 429/13; 429/26
(58) Field of Search ............................ 429/13, 22, 23, 429/24, 25, 26

(56) References Cited

U.S. PATENT DOCUMENTS

| | | | |
|---|---|---|---|
| 5,432,020 A | 7/1995 | Fleck | 429/13 |
| 6,173,690 B1 | 1/2001 | Aramaki | |
| 6,451,467 B1 * | 9/2002 | Peschke et al. | 429/73 |
| 6,530,753 B2 | 3/2003 | Aramaki | |
| 6,616,424 B2 * | 9/2003 | Raiser | 417/411 |
| 6,635,374 B1 | 10/2003 | Aramaki | |
| 6,638,652 B1 * | 10/2003 | Motozono et al. | 429/19 |
| 6,670,064 B2 * | 12/2003 | Keskula et al. | 429/25 |
| 2001/0010871 A1 * | 8/2001 | Katagiri et al. | 429/12 |
| 2002/0164508 A1 * | 11/2002 | Wheat et al. | 429/22 |
| 2002/0164509 A1 * | 11/2002 | Wheat et al. | 429/22 |

FOREIGN PATENT DOCUMENTS

| | | |
|---|---|---|
| JP | 7-14599 | 1/1995 |
| JP | 9-035735 A | 2/1997 |

OTHER PUBLICATIONS

U.S. Appl. No. 09/964676, filed Sep. 28, 2001, Kazuyoshi Aramaki.
U.S. Appl. No. 09/864215, filed May 25, 2001, Kazuyoshi Aramaki.
U.S. Appl. No. 09/563853 filed, May 04, 2000, Kazuyoshi Aramaki.
U.S. Appl. No. 09/296235 filed, Apr. 22, 1999, Kazuyoshi Aramaki.

* cited by examiner

Primary Examiner—Michael Barr
Assistant Examiner—Monique Wills
(74) Attorney, Agent, or Firm—Foley & Lardner LLP

(57) ABSTRACT

A fuel cell system is provided with a fuel cell supplied with air and fuel to generate electric power output, a main air-flow passage supplying the air to the fuel cell, an air treatment unit located in the main air-flow passage, a bypass flow passage connected to the main air-flow passage in parallel with the air treatment unit, and a flow-passage change-over valve executing a change-over between the main air-flow passage and the bypass flow passage and allowing the bypass flow passage to supply the air to the fuel cell during start-up operation until a predefined condition is established.

16 Claims, 5 Drawing Sheets

FUEL CELL SYSTEM

BACKGROUND OF THE INVENTION

The present invention relates to a fuel cell system adapted to be supplied with fuel and compressed air at a variable flow rate.

In a fuel cell system of the related art, fuel gas (hydrogen gas) is supplied to a fuel electrode and air is supplied to an oxidation electrode, with fuel gas and air electrochemically reacting with one another to generate electric power output.

In such a fuel cell system, it has been a usual practice to have a fuel cell to be supplied with compressed air delivered from a compressor. In order to drive the compressor with less energy consumption and to optimize the operation of the fuel cell throughout various operating conditions thereof, in Japanese Patent Application Laid-Open Publication No. 7-14599, the fuel cell system includes a compressor connected to a common shaft. The shaft is connected to a start-up motor and a main motor. The start-up motor is used for variably drive the compressor and is specifically suited for use in an automotive field. This start-up motor is supplied with electric power from a vehicular battery, whereas the main motor is supplied with electric power directly from a fuel cell via an electric current controller. During start-up of the fuel cell system, the compressor is driven with the start-up motor until a minimum air volume flow rate $V_{min}$ and a minimum operating pressure $P_{min}$ are enabled to be utilized. During such a time interval, the main motor is de-energized. In this instance, the minimum air volume flow rate $V_{min}$ and the minimum operating pressure $P_{min}$ are selected to have respective values such that the fuel cell generates electric energy at a level sufficient for the adequate operation of the whole fuel cell system.

SUMMARY OF THE INVENTION

However, the presence of two motors for driving the compressor renders the whole system to become complicated in structure with an increase in size and manufacturing cost. Also, during start-up of the fuel cell, the start-up motor needs to drive not only the compressor but also the main motor, resulting in an increased power consumption. For this reason, the vehicular battery, i.e., a secondary battery is required to have a relatively large capacity, thus requiring the secondary battery with a large capacity. This results in an increase in the manufacturing cost.

In an air supply passage between the compressor and the fuel cell, it may be proposed to locate an air treatment unit composed of a silencer and a heat exchanger in series to suppress noise and to adjust the temperature of compressed air to be supplied to the fuel cell. Due to provision of the air treatment unit in the air supply passage, the air supply passage tends to have an increased volume, inducing time delay in air pressure and the flow rate of compressed air to be supplied to the fuel cell with a lowered response. Therefore, during start-up of the fuel cell, the fuel cell is not supplied with a sufficient amount of compressed air at a desired pressure level, with a resultant longer time period required before the fuel cell begins to generate electric power. In order to drive the start-up motor for the compressor during such a longer time period, the start-up battery is required to have a large capacity or the start-up battery should be constructed of an expensive secondary battery in a large size, resulting in a remarkable increase in the manufacturing cost.

When executing start-up of the fuel cell system during a cold operating condition, the temperature of compressed air is lowered with the air treatment unit having a large heat capacity, degrading the operating efficiency in electric power generation of the fuel cell with a resultant deterioration in a start-up ability of the fuel cell. For this reason, the start-up battery tends to cover an increased load, and thus the start-up battery is required to have an increased capacity, making it necessary for the start-up battery to be formed with the expensive secondary battery of the large size in structure.

The present invention has been made with the above studies and has an object to provide a fuel cell system which enables to immediately supply air to a fuel cell during the start-up operation of the fuel cell system to speed up the rising time of the fuel cell with the use of a start-up battery of a small size in structure in a reduced power consumption.

According to one aspect of the present invention, there is provided a fuel cell system comprises: a fuel cell supplied with air and fuel to generate electric power output; a main air-flow passage supplying the air to the fuel cell; an air treatment unit located in the main air-flow passage; a bypass flow passage connected to the main air-flow passage in parallel with the air treatment unit; and a flow-passage change-over valve executing a change-over between the main air-flow passage and the bypass flow passage and allowing the bypass flow passage to supply the air to the fuel cell during a start-up operation until a predefined condition is established.

According to another aspect of the present invention, there is provided a fuel cell system comprises: a fuel cell supplied with air and fuel to generate electric power output; a main air-flow passage supplying the air to the fuel cell; a bypass flow passage connected in parallel with the main air-flow passage and having a lower volume than that of the main air-flow passage; and a flow-passage change-over valve executing a change-over between the main air-flow passage and the bypass flow passage and allowing the bypass flow passage to supply the air to the fuel cell during start-up operation until a predefined condition is established.

Other and further features, advantages, and benefits of the present invention will become more apparent from the following description taken in conjunction with the following drawings.

DETAILED DESCRIPTION OF THE PREFERRED EMBODIMENTS

To describe the present invention more in detail, several embodiments of the present invention will be explained with reference to the accompanied drawings below.

Figure 1:
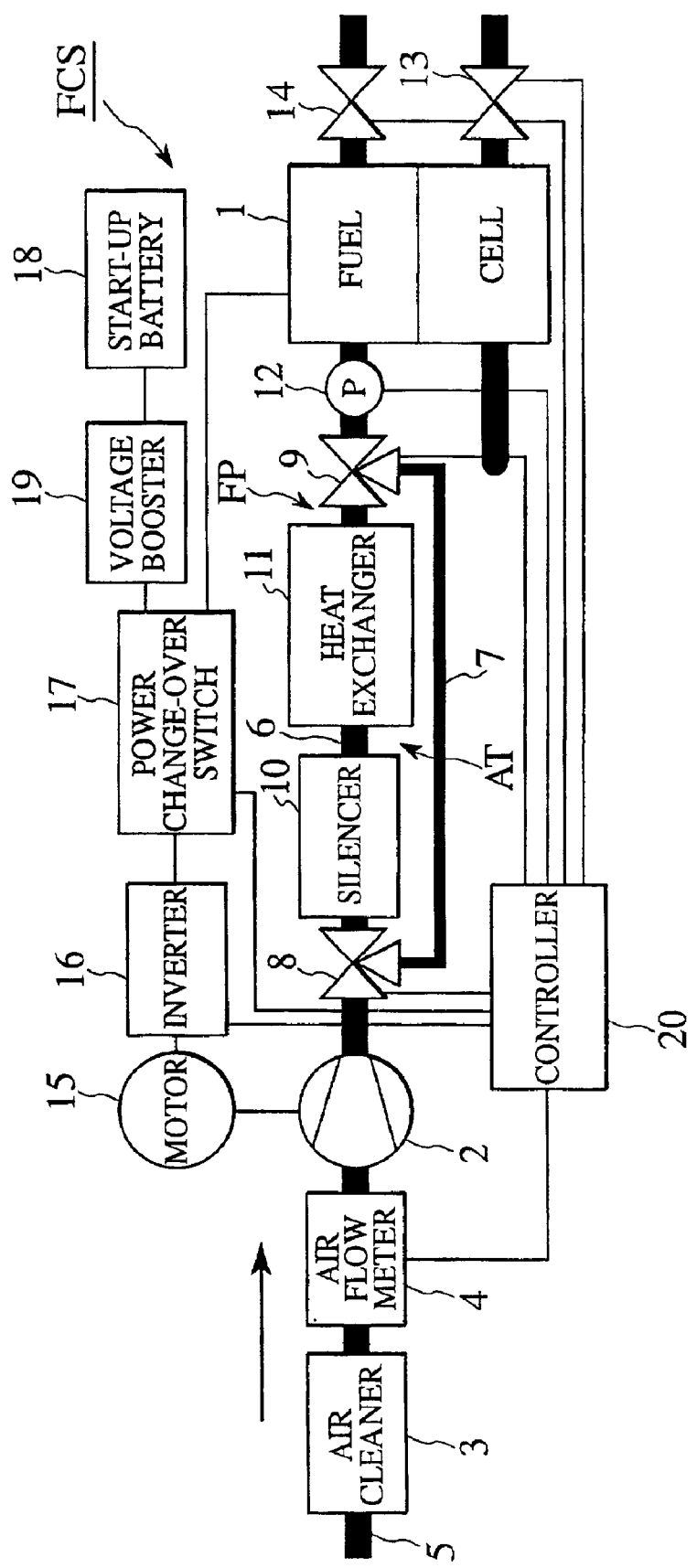
FIG. 1 is a block diagram illustrating a fuel cell system of a first embodiment according to the present invention.

FIG. 1 is a block diagram illustrating a first embodiment of a fuel cell system according to the present invention. Before entering into a detailed description of the present invention, it is to be noted here that in the embodiment of FIG. 1, the fuel cell system FCS is shown in a block diagram of a system involving only an oxygen (i.e., a compressed air) supply system associated with a fuel cell and forming an essential feature of the present invention while a fuel (i.e., hydrogen gas) supply system associated with the fuel cell is herein omitted for the sake of simplicity.

In the illustrated embodiment of FIG. 1, the fuel cell system FCS includes a fuel cell 1 which is supplied with compressed air and hydrogen gas to generate electric power output, and a compressor 2 which feeds compressed air to an oxidation electrode (i.e., a cathode) of the fuel cell 1.

At an upstream side of the compressor 2, the fuel cell system FCS includes an air cleaner 3 and an air flow meter 4. Air sucked from a duct 5 is drawn to the air cleaner 3 where air is cleaned and is then supplied to the compressor 2. The amount of air to be supplied to the fuel cell 1 is measured with the air flow meter 4.

The fuel cell system FCS further includes a main air-flow passage 6, a bypass flow passage 7 connected in parallel with the main air-flow passage 6, and a flow-passage change-over section FP including first and second change-over valves 8 and 9 connected to first and second branch points of the main air-flow passage 6 and the bypass flow passage 7, respectively, with first and second branch points being connected to the compressor 2 and the fuel cell 1, respectively. Actuation of these change-over valves 8 and 9 allows compressed air, which is fed from the compressor 2, to be selectively admitted through either one of the main air-flow passage 6 and the bypass flow passage 7 to the fuel cell 1.

The main air-flow passage 6 has a compressed air treatment unit AT including a silencer 10 and a heat exchanger 11. The silencer 10 serves to reduce fluctuating noises of compressed air delivered from the compressor 2 which is generally of a variable volume type. Also, the heat exchanger 11 serves to lower the temperature of compressed air to a level not to cause the fuel cell 1 to be damaged.

The bypass flow passage 7 is constructed of a conduit having a lower inner diameter than the main air-flow passage 6 and has no compressed air treatment unit such as the silencer 10 and the heat exchanger 11. With such a configuration, the presence of the narrow conduit is effective for lowering the volume of the bypass flow passage 7 in which the pressure is to be increased. Therefore, when compressed air delivered from the compressor 2 is introduced into the bypass flow passage 7, compressed air is enabled to be rapidly supplied to the fuel cell 1 at an amount adequate even for start up of the fuel cell system FCS without a time delay in the flow rate and pressure of compressed air, that would otherwise occur owing to a particular volume of the compressed air treatment unit of the main air-flow passage 6. Also, the bypass flow passage 7 is designed to have an inner small diameter in a range not to adversely affect on the pressure loss during changing over of the first and second change-over valves 8 and 9.

A pressure gauge 12 is located between the second change-over valve 9 and the fuel cell 1. The pressure gauge 12 functions to measure the pressure of compressed air to be introduced to the fuel cell 1.

A fuel electrode (i.e., an anode electrode) is supplied with feed fuel gas (i.e., hydrogen gas) from a fuel gas supply unit (not shown) at a pressure level regulated by a pressure regulator valve 13. Thus, compressed air and hydrogen gas are consumed in the fuel cell 1 for generating electric power output. Also, surplus air, which is not consumed in the fuel cell 1 for generation of electric power output, is exhausted to atmosphere through a pressure regulator valve 14.

The compressor 2 is driven with a motor 15 which is applied with electric power through an inverter 16, which controls an output frequency of the electric power to control the rotational speed of the motor 15, and a "power change-over" switch 17. The "power change-over" switch 17 functions to selectively change over between a first power line composed of a voltage booster 19 and a start-up battery (i.e., a battery of 12 V) 18 and a second power line connected to the fuel cell 1. The start-up battery 18 serves to supply electric power to the motor 15 to start up the compressor 2 during start up of the fuel cell system FCS. In an event that the amount of electric power output of the fuel cell 1 is insufficient for suitably driving the motor 15, the start-up battery 18 is used to supply electric power to the motor 15 through the inverter 16, the "power change-over" switch 17 and the voltage booster 19. When, in this instance, the amount of electric power output of the fuel cell 1 increases beyond a given level adequate for covering power consumption required for driving the compressor 2 and various accessory units, the "power change-over" switch 17 is operated to select the power line from the fuel cell 1 to enable electric power generated thereby to be delivered to the motor 15 through the inverter 16 and the "power change-over" switch 17.

The fuel cell system FCS further includes a controller 20 which serves as a unit for controlling the operation of the fuel cell system FCS. More particularly, the controller 20 is applied with a flow rate detection signal and a pressure level detection signal generated from the air flow meter 4 and the pressure gauge 12, respectively, and functions to control the operations of the first and second change-over valves 8 and 9, the pressure gage 12, the pressure regulator valves 13 and 14, the inverter 16 and the "power change-over" switch 17 in response to the above detection signals.

Figure 2:
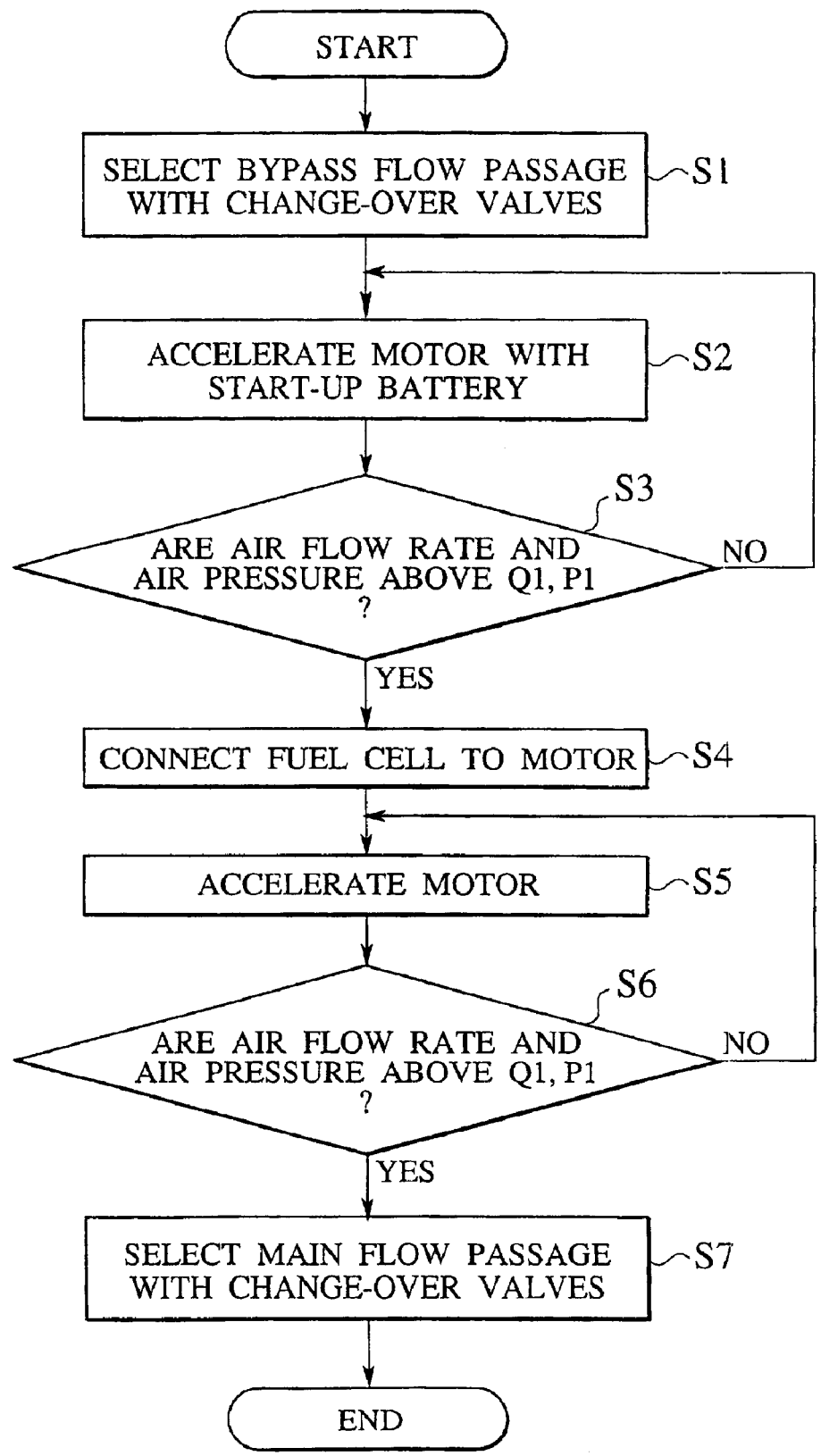
FIG. 2 is a flow diagram illustrating the basic sequence of operations which are repetitively executed by a controller shown in FIG. 1.

FIG. 2 is a general flow diagram for illustrating the basic sequence of start up operations, of the compressor 2 and its associated accessory units, which are repetitively executed by the controller 20 in accordance with a predefined program. This control is initiated immediately after the start up operation of the fuel cell system FCS has begun.

At the start, the fuel cell system FCS is energized. In step S1, the first and second change-over valves 8 and 9 are actuated to allow the flow passage leading from the compressor 2 to communicate with the bypass flow passage 7. In step S2, electric power is applied from the start up battery 18 to the motor 15 which is accelerated toward a prescribed rotational speed defined by the output frequency of the inverter 16.

Then in step S3, the air flow rate Q measured by the air flow meter 4 and the air pressure level P measured by the pressure gauge 12 are respectively compared with a "power change-over" flow-rate threshold value Q1 and a "power change-over" pressure-level threshold value P1 to discriminate whether these detected values Q and P are respectively equal to or exceed these "power change-over" threshold values Q1 and P1. Here, the "power change-over" flow-rate threshold value Q1 and the "power change-over" pressure-level threshold value P1 are designed as reference values, representing suitable values which are preliminarily designed, at which the amount of electric power output generated by the fuel cell 1 has reached a predefined level sufficient for enabling the motor 15 and the various accessory units to be concurrently driven in a suitable manner, with a view to enabling the controller 20 to execute discrimination.

With such discrimination, when at least one of the air flow rate Q and the pressure level P does not exceed the "power change-over" flow-rate threshold value Q1 or the "power change-over" pressure-level threshold value P1, i.e., when the fuel cell 1 is not fully started up to a level sufficient for suitably driving the motor 15, etc., the operation returns to step S2 in which the motor 15 is further accelerated.

In contrast, when the air flow rate Q is equal to or exceeds the "power change-over" flow-rate threshold value Q1 and concurrently the pressure level P is equal to or exceeds the "power change-over" pressure-level threshold value P1, i.e., when the fuel cell 1 reaches the fully started up condition to enable the suitable operation of the motor 15 and the accessory units, the operation goes to step S4 in which the "power change-over" switch 17 is actuated to select the power line from the fuel cell 1 to supply power to the motor 15.

While the illustrated embodiment of FIG. 1 has been shown and described with reference to the example wherein two parameters such as the air flow rate Q and the pressure level P are used to execute discrimination for the "power change-over" and wherein when both the air flow rate Q and the pressure level P are equal to or exceed the respective "power change-over" threshold values Q1 and P1, the "power change-over" is executed, the present invention is not limited to such an operation. Namely, either the air flow rate Q or the pressure level P may be used for executing discrimination for the "power change-over". Alternately, while using both the air flow rate Q and the pressure level P for discrimination of the "power change-over", the "power change-over" may be executed when either the air flow rate Q or the pressure level P is equal to or exceeds the "power change-over" flow-rate threshold value Q1 or the "power change-over" pressure level threshold value P1. In this manner, the measured values to be used in determination of such "power change-over" timings may be suitably selected and any modified combinations of these measured values may also be utilized.

In step S5, the inverter 16 produces an increased output frequency by converting power output delivered from the fuel cell 1 such that the motor 15 is accelerated toward a target rotational speed.

Then in step S6, the air flow rate Q and the pressure level P are compared with the respective "flow-passage change-over" flow-rate threshold value Q2 and "flow-passage change-over" pressure-level threshold value P2. In this instance, it is discriminated whether the air flow late Q and the air pressure P are respectively equal to or exceed the respective threshold values Q2 and P2. Here, the "flow-passage change-over" flow-rate threshold value Q2 and the "flow-passage change-over" pressure-level threshold value P2 are designed as reference values, representing suitable values which are preliminarily designed, at which the flow rate and the pressure level of compressed air delivered from the compressor 2 have reached respective predefined levels sufficient for enabling the compressed air to flow through the main air-flow passage 6 so as to supply the air to the fuel cell 1 enough, with a view to enabling the controller 20 to execute discrimination. To this end, the "flow-passage change-over" flow-rate threshold value Q2 and the "flow-passage change-over" pressure-level threshold value P2 are respectively preliminarily designed at respective suitable values greater than the "power change-over" flow-rate threshold value Q1 and the "power change-over" pressure-level threshold value P1.

With such discrimination, when at least one of the flow rate and the pressure level of compressed air does not exceeds the "flow-passage change-over" flow-rate threshold value Q2 or the "flow-passage change-over" pressure-level threshold value P2, the operation returns to step S5 wherein the motor 15 is further accelerated.

On the other hand also, when the air flow-rate Q is equal to or exceeds the "flow-passage change-over" flow-rate threshold value Q2 and concurrently the pressure level P is equal to or exceeds the "flow-passage change-over" pressure-level threshold value P2, i.e., when the flow rate and the pressure level of the compressed air produced by the compressor 2 have reached the respective target values ready for allowing compressed air to pass through the main air-flow passage 6 without any obstacles, the operation goes to step S7 in which the first and second change-over valves 8 and 9 are actuated to admit compressed air from the compressor 2 to pass through the main air-flow passage 6.

While the first illustrated embodiment has been shown and described with reference to the example wherein when both the air flow rate Q and the pressure level P are equal to or exceed the respective "flow-passage change-over" threshold values Q2 and P2, the "flow-passage change-over" is executed, the present invention is not limited to such an operation. Namely, either one of the air flow rate Q or the pressure level P may be used for executing discrimination for the "flow-passage change-over". Alternately, while using both the air flow rate Q and the pressure level P for discrimination of the "flow-passage change-over", the "flow-passage change-over" may be executed when either the air flow rate Q or the pressure level P is equal to or exceeds the "flow-passage change-over" flow-rate threshold value Q2 or the "flow-passage change-over" pressure level threshold value P2. In this manner, the measured values to be used in determination of such "flow-passage change-over" timings may be suitably selected and any modified combinations of these measured values may also be utilized.

In the execution of step S7, a routine for the start up control is completed and the fuel cell system FCS goes to its normal operation. In such a normal operation, compressed air delivered from the compressor 2 is supplied through the main air-flow passage 6 to the fuel cell 1 by which electric power is generated.

Now, the representative advantages of the fuel cell system FCS are described below in detail.

Starting up the fuel cell system FCS, the motor 15 is applied with electric power from the start-up battery 18 and drives the compressor 2 to begin supply of compressed air to the fuel cell 1. In this instance, the rotational speed of the motor 15 is controlled to a suitable level by the controller 20 so as to meet a desired start-up condition.

Concurrent with the beginning of start-up operation, the bypass flow passage 7 is selected to couple the compressor 2 to the fuel cell 1 by the first and second change-over valves 8 and 9. With such a bypass flow passage 7 selected, compressed air bypasses the various compressed air treatment units such as the silencer 10 and the heat exchanger 11 located in the main air-flow passage 6 and flows through the bypass flow passage 7 to the fuel cell 1.

In such a structure, when the fuel cell system FCS is started up, the presence of compressed air admitted through the bypass flow passage 7, with no compressed air treatment units, to the fuel cell 1 is effective for avoiding the time delay, in the flow rate and the pressure level of the compressed air, which would otherwise occur in a total large volume of the compressed air treatment units such as the silencer 10 and the heat exchanger 11 particularly located in the main air-flow passage 6. Also, the presence of the bypass flow passage 7, composed of the narrow conduit with its inner diameter smaller than the main air-flow passage 6 by a limited degree which does not cause the pressure loss during the "flow-passage change-over" operation, prevents the pressure in the conduit from increasing to an excessively high level. As a consequence, the fuel cell 1 is enabled to be immediately supplied with sufficient amount of compressed air from the beginning of the start-up operation of the compressor 2 for thereby allowing the fuel cell 1 to be started up even in an early stage. This results in decreased power consumption in the start-up battery 18, making it possible for the start-up battery 18 to be composed of a battery in a relatively small size and reduced weight. This avoids the requirement for an expensive and heavy secondary battery, with a resultant reduction in manufacturing cost as well as a resultant miniaturization in size.

During the start-up operation at cold temperature, since compressed air is supplied to the fuel cell 1 while bypassing the air treatment units, such as the silencer 10 and the heat exchanger 11, which has a large heat capacity, the temperature of compressed air is immediately raised to a suitable level such that a power generation efficiency of the fuel cell 1 is satisfactorily increased.

Thus, even when the bypass flow passage 7 is selected to supply compressed air to the fuel cell 1 without causing compressed air to pass through the silencer 10 and the heat exchanger 11 of the main air-flow passage 6, there are no matters as far as the compressed air is allowed to flow through the bypass flow passage 7 in an early stage of the start-up of the fuel cell system FCS, i.e., when the flow rate Q and the air pressure level P remain below the "flow-passage change-over" flow-rate threshold value Q2 and the "flow-passage change-over" pressure-level threshold value P2. That is, in such an early stage of the start-up operation of the fuel cell system FCS, since the rotational speed of the compressor 2 remains at a low level, the noise created due to exhausting of compressed air remains at a low level, thereby enabling the silencer 10 to be dispensed with. Since, also, the temperature of compressed air exhausted from the compressor 2 remains at a low level, it is unnecessary to decrease the air temperature with the use of the heat exchanger 11.

With such a start-up operation, as the rotational speed of the motor 15 increases, the flow rate Q and the pressure level P of compressed air delivered from the compressor 2 also increases. In addition, when the flow rate Q and the pressure level P of compressed air exceed the "power change-over" flow-rate threshold value Q2 and the "power change-over" pressure-level threshold value P2, respectively, the second power supply line leading from the fuel cell 1 is connected to the motor 15.

Also, when the rotational speed of the motor 15 increases, and the air flow rate Q and the pressure level P exceeds the "flow-passage change-over" flow rate Q2 and the "flow-passage change-over" pressure level P2, the main air-flow passage 6 is selected to allow compressed air to be supplied through the same to the fuel cell 1. With such selection of the main air-flow passage 6, the start-up control related to the sequence of operations for supplying compressed air to the fuel cell 1 is completed, and the fuel cell system FCS goes to the normal operation in terms of supply of compressed air relative to the fuel cell 1.

In such a structure, since the air supply passages are changed over between the main air-flow passage 6 and the bypass flow passage 7 in dependence on the desired flow rate and/or the desired pressure level of the air to be supplied to the fuel cell 1, the control in change-over of the air supply passage can be exactly implemented in dependence on the desired conditions of the air to be supplied to the fuel cell.

At least, the presence of the pressure gage 12 located downstream of the junction where the main air-flow passage 6 and the bypass flow passage 7 merge allows the pressure level of the air to be measured at a location in close proximity to the fuel cell 1 such that the pressure level of the air is exactly detected, thereby making it possible for the controller 20 to precisely control the change-over of the air supply passages responsive to the detected pressure level.

Further, while the air with a relatively low temperature is delivered through the bypass flow passage 7 to the fuel cell 1 to enable the fuel cell 1 to be successfully started up in the early stage of the start-up operation, when the temperature of the air increases to a higher level after the start-up operation of the fuel cell 1 has been completed, the air supply passages are changed over from the bypass flow passage 7 to the main air-flow passage 6 to allow the air to be treated with the heat exchanger 11 to lower the temperature of the air to a level not to damage the fuel cell 1. Thus, during the time period both of the start-up operation and the normal operation of the fuel cell system FCS, the air is enabled to be supplied to the fuel cell 1 at a desired pressure and flow rate to suit the operating condition of the fuel cell system FCS.

Still further, during the start-up operation of the fuel cell system FCS, i.e., when the noise of the air remains at a relatively low level, the air is supplied through the bypass flow passage 7 to the fuel cell 1 to enable the quick start-up operation. After completion of the start-up operation, i.e., when the noise of the air becomes relatively high in level, the air supply passage is changed over from the bypass flow passage 7 to the main air-flow passage 6 such that the noise of the air is suppressed with the silencer 10. Consequently, it is possible to prevent the air from generating noises in a highly reliable manner throughout the various operating conditions of the fuel cell system FCS.

Figure 3:
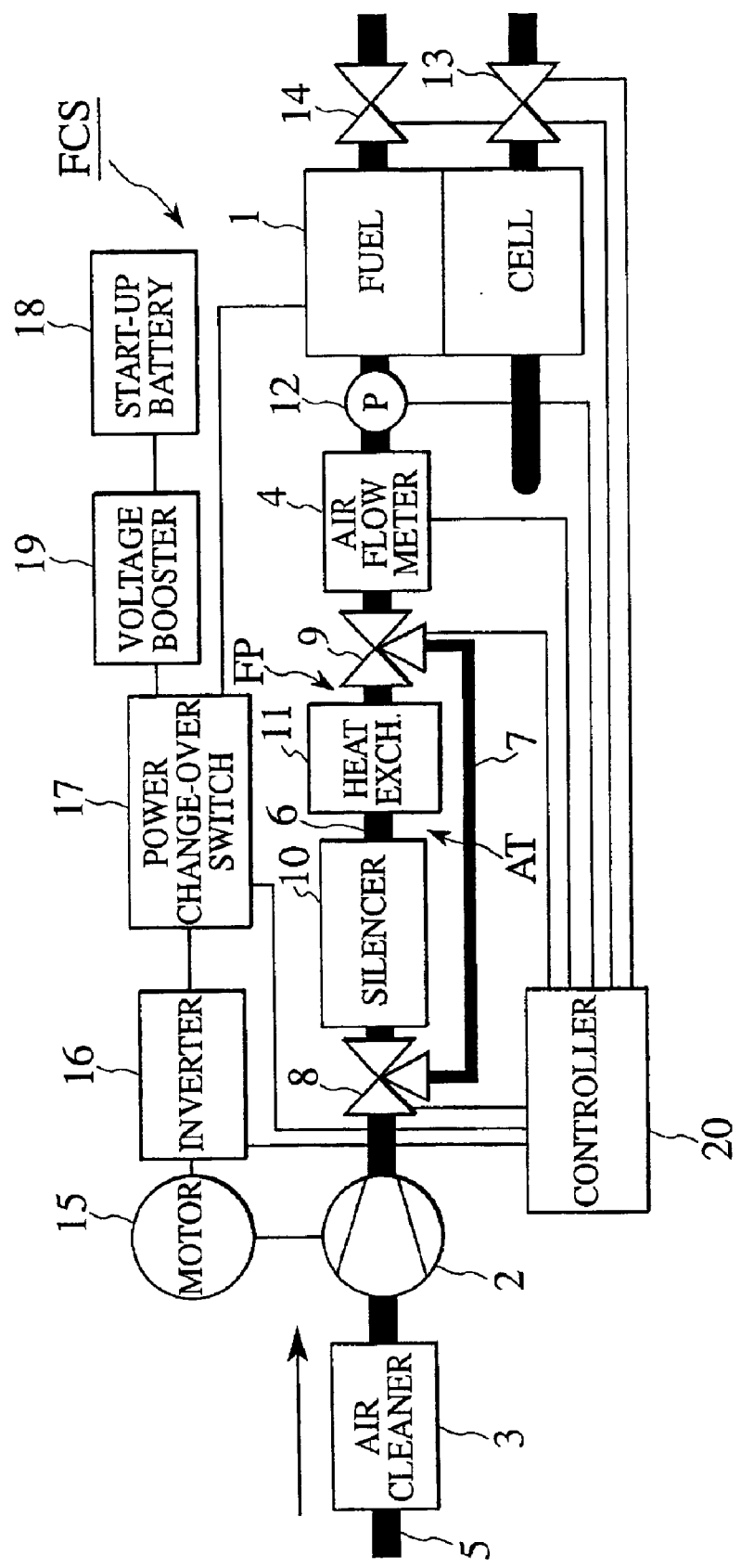
FIG. 3 is a block diagram illustrating a fuel cell system of a second embodiment according to the present invention.

FIG. 3 is a block diagram illustrating a second embodiment of a fuel cell system according to the present invention.

The fuel cell system of the second embodiment has the same structure as that of the first embodiment except for that while, in the first embodiment of FIG. 1, the air flow meter 4 is located upstream of the compressor 2, the air flow meter 4 is located downstream of the second change-over valve 9 in the second embodiment. Therefore, in FIG. 3, like parts bears the same reference numerals as those used in FIG. 1 and description of the same parts is omitted for the sake of simplicity.

In the second embodiment, since the air flow meter 4 is located directly upstream of the fuel cell 1, the flow rate of compressed air to be supplied to the fuel cell 1 can be accurately measured at a location in close proximity to the fuel cell 1, thereby enabling control of the fuel cell system at a highly accurate fashion.

Figure 4:
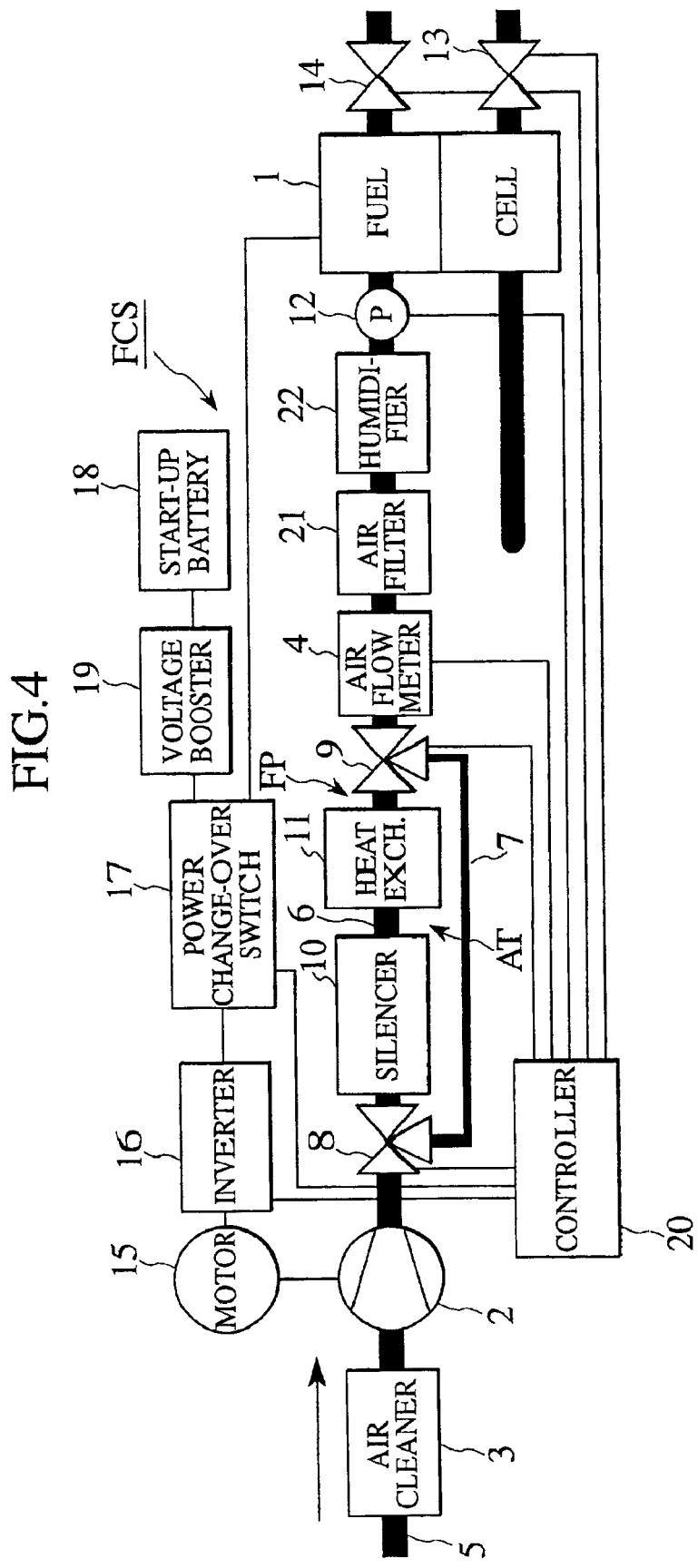
FIG. 4 is a block diagram illustrating a fuel cell system of a third embodiment according to the present invention.

FIG. 4 is a block diagram illustrating a third embodiment of a fuel cell system according to the present invention.

The fuel cell system of the third embodiment has the same structure as that of the second embodiment except for that the fuel cell system further includes an air filter 21 and a humidifier (i.e., a moisture controller) 22 located in an air supply conduit between the air flow meter 4 and the pressure gauge 12. Therefore, in FIG. 4, like parts bears the same reference numerals as those used in FIG. 3 and description of the same parts is omitted for the sake of simplicity.

In the third embodiment, even when compressed air is supplied to the fuel cell 1 through the bypass flow passage 7 during the start-up operation of the fuel cell system FCS, harmful dusts can be removed from compressed air by the air filter 21 located upstream of the fuel cell 1. Further, compressed air can be suitably humidified to an optimum level by the humidifier 22, thereby enhancing an increased power generation efficiency.

Figure 5:
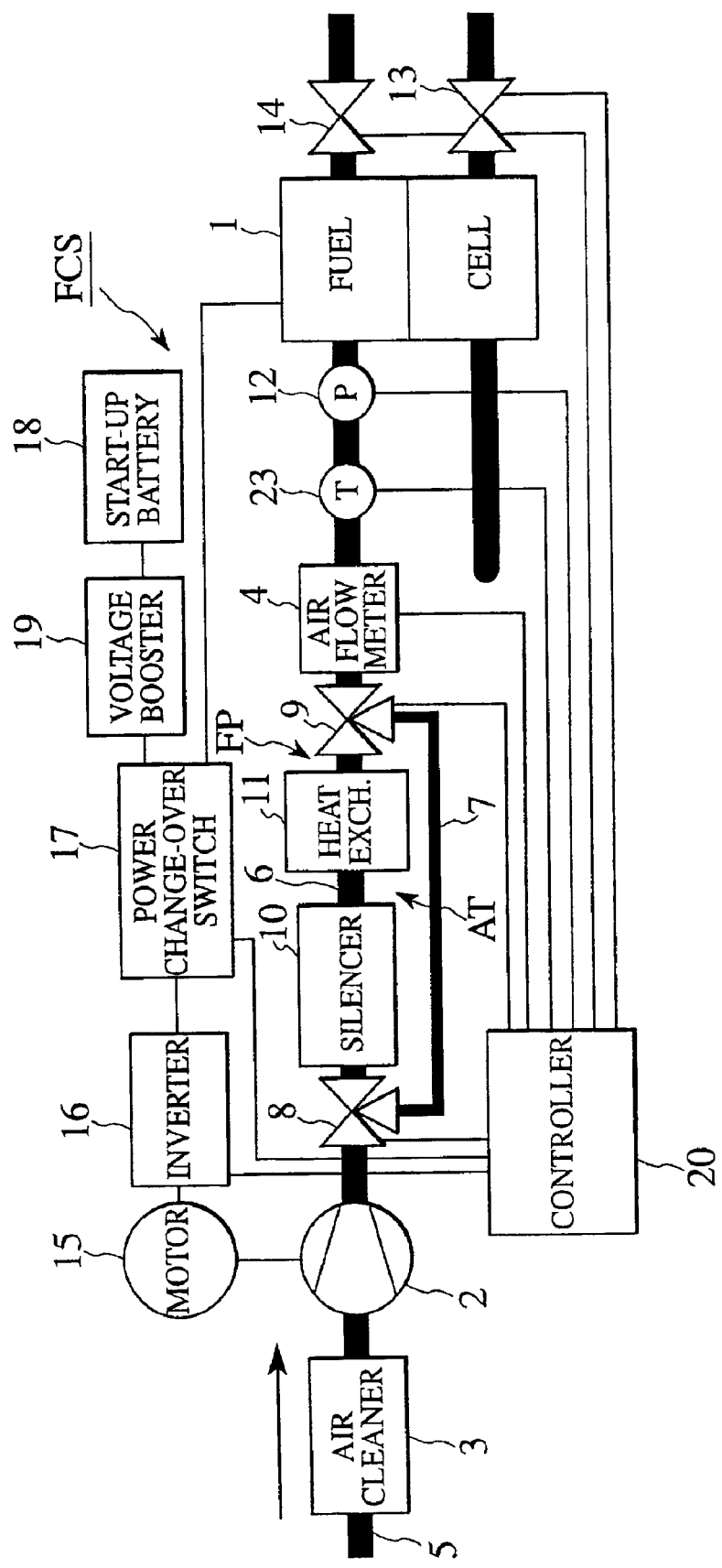
FIG. 5 is a block diagram illustrating a fuel cell system of a fourth embodiment according to the present invention.

FIG. 5 is a block diagram illustrating an essential part of a fourth embodiment of a fuel cell system according to the present invention.

In the fourth embodiment, the fuel cell system FCS further includes a temperature sensor 23 in an air supply conduit between the air flow meter 4 and the pressure gauge 12. The temperature sensor 23 functions to monitor the temperature of compressed air to be supplied to the fuel cell 1 for producing a detection signal, indicative of a temperature T, which is compared with a threshold temperature signal in the controller 20. When the temperature T is equal to or exceeds a "flow-passage change-over" temperature threshold value T2 in the controller 20, the controller 20 actuates the first and second change-over valves 8 and 9 such that the bypass flow passage 7 is changed over to the main air-flow passage 6 which allows compressed air, flowing from the compressor 2, to be supplied to the fuel cell 1. In such a manner, the flow passage for the compressed air can be changed over between the main and bypass flow passages in response to the temperature of compressed air, thereby enabling the change-over of the flow passages at a further suitable timings especially during the cold start-up operation such that a starting ability of the fuel cell 1 is improved. Further, in the fourth embodiment, the parameters, by which the "flow-passage change-over" timings are determined, may further includes, in addition to the temperature T of compressed air, the air flow rate Q, the air pressure level P and a suitable combination of these parameters.

The entire content of a Patent Application No. TOKUGAN 2000-304673 with a filing date of Oct. 4, 2000 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system comprising:
    a fuel cell supplied with air and fuel to generate electric power output;
    a main air-flow passage supplying the air to the fuel cell;
    an air treatment unit located in the main air-flow passage;
    a bypass flow passage connected to the main air-flow passage in parallel with the air treatment unit; and
    a flow-passage change-over valve executing a change-over between the main air-flow passage and the bypass flow passage and allowing the bypass flow passage to supply the air to the fuel cell during a start-up operation until a predefined condition is established.

2. A fuel cell system according to claim 1, wherein the bypass flow passage has an inner diameter smaller than that of the main air-flow passage.

3. A fuel cell system according to claim 1, further comprising:
    a compressor supplying the air to the fuel cell;
    a motor driving the compressor;
    a start-up battery supplying electric power to the motor during the start-up operation; and
    a power supply change-over switch allowing the start-up battery to be changed over to the fuel cell to supply electric power to the motor when it is detected that the fuel cell has reached an operating state to generate the electric power output at a given amount.

4. A fuel cell system according to claim 1, wherein the air treatment unit includes a heat exchanger.

5. A fuel cell system according to claim 1, wherein the air treatment unit includes a silencer.

6. A fuel cell system according to claim 1, wherein the flow-passage change-over valve selectively executes a change-over between the main air-flow passage and the bypass flow passage in response to the flow rate of air supplied to the fuel cell.

7. A fuel cell system according to claim 6, further comprising an air flow meter measuring the flow rate of the air and located downstream of a junction where the main air-flow passage and the bypass flow passage merge.

8. A fuel cell system according to claim 1, wherein the flow-passage change-over valve executes a change-over between the main air-flow passage and the bypass flow passage in response to a pressure of the air supplied to the fuel cell.

9. A fuel cell system according to claim 1, further comprising a pressure gauge measuring the pressure of the air and located downstream of a junction where the main air-flow passage and the bypass flow passage merge.

10. A fuel cell system according to claim 1, wherein the flow-passage change-over valve executes a change-over between the main air-flow passage and the bypass flow passage in response to the temperature of the air supplied to the fuel cell.

11. A fuel cell system according to claim 1, further comprising a temperature sensor measuring the temperature of the air supplied to the fuel cell and located downstream of a junction where the main air-flow passage and the bypass flow passage merge.

12. A fuel cell system according to claim 1, further comprising an air filter located downstream of a junction where the main air-flow passage and the bypass flow passage merge.

13. A fuel cell system according to claim 1, further comprising a humidifier located downstream of a junction where the main air-flow passage and the bypass flow passage merge.

14. A fuel cell system comprising:
    a fuel cell supplied with air and fuel to generate electric power output;
    a main air-flow passage supplying the air to the fuel cell;
    a bypass flow passage connected in parallel with the main air-flow passage and having a lower volume than that of the main air-flow passage; and
    a flow-passage change-over valve executing a change-over between the main air-flow passage and the bypass flow passage and allowing the bypass flow passage to supply the air to the fuel cell during start-up operation until a predefined condition is established.

15. A fuel cell system comprising:
    a fuel cell supplied with air and fuel to generate electric power output;
    a main air-flow passage supplying the air to the fuel cell;
    an air treatment unit having a silencer and a heat exchanger located in the main air-flow passage;
    a bypass flow passage connected to the main air-flow passage in parallel with the main air-flow passage;
    a flow-passage change-over valve executing a change-over between the main air-flow passage and the bypass flow passage and allowing the bypass flow passage to supply the air to the fuel cell during start-up operation until a predefined condition is established;
    a compressor supplying the air to the fuel cell;
    a motor driving the compressor;
    a start-up battery supplying electric power to the motor during the start-up operation; and
    a power supply change-over switch allowing the start-up battery to be changed over to the fuel cell to supply electric power to the motor when it is detected that the fuel cell has reached an operating state to generate the electric power output at a given amount,
    wherein the bypass flow passage has an inner diameter smaller than the main air-flow passage.

16. A fuel cell system comprising:
    a fuel cell supplied with air and fuel to generate electric power output;
    main passage means for supplying the air to the fuel cell;
    treating means for treating the air flowing through the main passage means;
    bypass passage means for causing air to bypass the treating means; and
    controlling means for executing a change-over between the main passage means and the bypass passage means and allowing the bypass passage means to supply the air to the fuel cell during start-up operation until a predefined condition is established.

* * * * *